US006807419B1

(12) United States Patent
Laiho et al.

(10) Patent No.: US 6,807,419 B1
(45) Date of Patent: Oct. 19, 2004

(54) SRNS RELOCATION IN A UMTS NETWORK

(75) Inventors: Keijo Laiho, Masala (FI); Satu Simonen, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 549 days.

(21) Appl. No.: 09/718,675

(22) Filed: Nov. 22, 2000

(30) Foreign Application Priority Data

Nov. 23, 1999 (GB) .............................. 9927672

(51) Int. Cl.[7] .............................................. H04Q 7/20
(52) U.S. Cl. .................... 455/436; 455/432.1; 455/450; 455/509; 370/329; 370/331
(58) Field of Search .............................. 455/422, 432.1, 455/432.2, 436, 442, 453, 438, 509, 452.1, 452.2; 370/320, 329, 331, 537

(56) References Cited

U.S. PATENT DOCUMENTS

| 5,646,978 A | * | 7/1997 | Klem et al. ................. 455/436 |
| 5,930,714 A | * | 7/1999 | Abu-Amara et al. ........ 455/442 |
| 5,974,036 A | * | 10/1999 | Acharya et al. ............ 370/331 |
| 6,212,380 B1 | * | 4/2001 | Laatu ......................... 455/436 |
| 6,374,112 B1 | * | 4/2002 | Widegren et al. ......... 455/452.2 |

FOREIGN PATENT DOCUMENTS

| FI | WO98/37721 | * 8/1998 | ............ H04Q/7/38 |
| FI | WO99/51051 | * 10/1999 | ............ H04Q/7/38 |
| US | WO95/15665 | * 6/1995 | ............ H04Q/7/24 |
| WO | 98/37721 | 8/1988 | |
| WO | 99/39528 | 8/1999 | |
| WO | 99/51051 A2 | 10/1999 | |
| WO | 99/53668 | 10/1999 | |

OTHER PUBLICATIONS

TS 125 413 UMTS; UTRAN Iu interface RANAP signalling (v3.0.0) Release 1999, pp. 1–147, ETSI, F06921, Sophia Cedex, France.*
TS 125 331 UMTS; RRC Protocol Specification (v3.1.0) Release 1999, pp. 1–282, ETSI F06921, Sophia Cedex, France.*
"TS 125 413 Universal Mobile Telecommunications System (UMTS); UTRAN Iu Interface RANAP Signalling (3G TS 25.413 Version 3.0.0 Release 1999)", ETSI, Jan. 2000 pp. 1–147, XP 002165163; European Telecommunications Standards Institute, F–06921 Sophia Antipolis Cedex, France.
TS 125 331 Universal Mobile Telecommunications System (UMTS); RRC Protocol Specification (3G TS 25.331 Version 3.1.0 Release 1999):, ETSI, Jan. 2000, pp. 1–282, XP 002165164; European Telecommunications Standards Institute, F–06921 Sophia Antipolis Cedex, France.

* cited by examiner

*Primary Examiner*—William Trost
*Assistant Examiner*—Stephen D'Agosta

(57) ABSTRACT

A method of performing a SRNS Relocation in a UMTS network for a given UE, the method comprising sending a Relocation Required message from the serving RNC to the core network and sending a Relocation Request message from the core network to the target RNC, the Relocation Required message containing a RRC Initialisation Information container which is incorporated transparently by the core network into the Relocation Request message, and the RRC Initialisation Information container in turn containing information enabling a mapping to be made between RABs and RBs for the UE.

2 Claims, 6 Drawing Sheets

SRNS RELOCATION IN A UMTS NETWORK

This application claims priority under 35 U.S.C. §§ 119 and/or 365 to Application No. 9927672.7 filed in Great Britain on Nov. 23, 1999; the entire content of which is hereby incorporated by reference.

BACKGROUND

The present invention relates to SRNS Relocation in a UMTS network and more particularly to the transfer of radio resources between a SRNS and a target RNS during such Relocation.

BACKGROUND TO THE INVENTION

FIG. 1 illustrates schematically a part of a Universal Mobile Telecommunications System (UMTS) network. The network includes a core network part 1, which may be a network handling voice calls using UMTS Mobile-services Switching Centres (UMSCs) or may be a data network such as a General Packet Radio Service (GPRS) network including Serving GPRS Support Nodes (SGSNs). In FIG. 1 the UMSCs and SGSNs are indicated generally with the reference numeral 2. A subscriber or User Equipment (UE) 3 is coupled to the core network 1 via an access network 4 referred to as a Universal Terrestrial Radio Access Network (UTRAN). More particularly, the UMSCs/SGSNs 2 are connected to Radio Network Controllers (RNCs) 5,6 of the UTRAN 4 over an interface referred to as the Iu interface.

Each RNC 5 forms part of a Radio Network Subsystem (RNSs) 7,8 which also comprises a set of Base Transceiver Stations 9 referred to in UMTS terminology as Node B's. The interface between a RNC 5,6 and a Node B 9 is known as the Iub interface. A node B 9 provides the connection point for a UE 3 to the UTRAN 4, and the interface between the Node B 9 and the UE 3 is known as the Uu interface. The RNS (RNS 7 in FIG. 1) which connects a UE 3 to the core network 1 at any given time is referred to as the Serving RNS (SRNS) for that particular UE 3.

FIG. 2 illustrates in very general terms the bearer structure used by UTRAN to carry user data between the UE 3 and the core network 1. When it is required to establish a user plane connection, the responsible UMSC or SGSN 2 instructs the UTRAN 4 to establish a logical connection between the UMSC or SGSN 2 and the UE 3. This logical connection is referred to as a Radio Access Bearer (RAB). The established RAB inherits requirements of the requested UMTS service, e.g. Quality of Service, etc. Based on the inherited requirements of the RAB, the RNC 5,6 establishes user plane connections with the core network 1 (i.e. UMSC or SGSN 2) and with the UE 3. The connection between the RNC 5,6 and the core network 1 is referred to as the Iu bearer whilst the connection between the RNC 5,6 and the UE 3 is referred to as the Radio Bearer (RB). Both of these bearers represent further logical channels, with the RNC performing a mapping between them. The bearers themselves are mapped onto appropriate traffic channels for transmission over the respective interfaces (Iu and Uu).

A single UE 3 may be associated with one or more RABs. For example, a UE 3 may simultaneously make use of one RAB established for a voice call, and another RAB established for a data call. The RNC 5,6 uses RAB identifiers (allocated by the core network) to distinguish between these different RABs. In the same way, a RB identity is used to distinguish between RBs. During the setting-up of a new user plane connection, a RAB and a RB are implicitly associated with one another by the RNC.

An important feature of mobile telecommunication systems is the ability to allow subscribers to move within (and outside) particular networks. This often requires a process known as SRNS relocation, in which an existing SRNS is replaced by a target RNS. Considering a scenario known as Hard Handover where a UE moves out of the area of responsibility of a first RNS, into a new RNS, it is necessary that the RNC (i.e. the Serving RNC (RNC$_S$)) of the SRNS be replaced by the RNC (referred to during the transition phase as the Target RNC (RNC$_T$)) of the second RNS, as the access RNC for the UE. In some circumstances, the Target RNC may immediately become the Serving RNC, with the user plane connection being established between the Target RNC and the core network. In other circumstances, the user plane connection extends between the Target RNC (which is thereafter referred to as a "drift" RNC) and the core network via the Serving RNC, where the interface between the drift RNC and the Serving RNC is known as the Iur interface. The network may subsequently decide to convert the drift RNC into the Serving RNC, establishing a direct user plane connection to the core network.

In either scenario, the SRNS relocation process may be initiated by the Serving RNC sending to the core network (UMSC or SGSN) a Relocation Required message. This message is currently defined in the Radio Access Network Application Part (RANAP) protocol (UMTS TS 25.413) and carried over the Iu interface. The core network responds to receipt of a Relocation Required message by sending a Relocation Request message to the Target RNC. The Relocation Request message is also defined in the RANAP protocol.

The Relocation Request message contains the identities of the RABs to be transferred. Both the Relocation Request message and the Relocation Required message contain an RRC Initialisation Information container. This container is defined in the Radio Resource Control (RRC) protocol (UMTS TS 25.331), and contains amongst other things the identities of the RBs to be transferred as well as details of the mappings between the RBs and the lower layer attributes, i.e. to logical, transport, and physical channels. It is noted that the RB identities and the mappings between the RBs and the lower layer attributes are contained in a container which is passed transparently by the core network.

SUMMARY OF THE INVENTION

The inventors of the present invention have recognised that in order to deal with a SRNS Relocation situation for a given UE, where that UE has multiple RABs allocated to it, the Target RNC must have a knowledge of the mappings between the RABs and the RBs. Under the current proposal, neither the Relocation Request message nor the Relocation Required message contain sufficient information to perform this mapping. The result is that confusion might arise at the Target RNC, with the Target RNC associating RBs with the wrong RABs. In such a situation, calls may be incorrectly connected and resources allocated inappropriately.

According to a first aspect of the present invention there is provided a method of performing a SRNS Relocation in a UMTS network for a given UE, the method comprising sending a Relocation Required message from the Serving RNC to the core network and sending a Relocation Request message from the core network to the Target RNC, the Relocation Required message containing a RRC Initialisation Information container which is incorporated transparently by the core network into the Relocation Request message, and the RRC Initialisation Information container in turn containing information enabling a mapping to be made between RABs and RBs for the UE.

Preferably, where an RRC Initialisation Information container contains a Radio Bearer Information element, said mapping comprises for each RB, a RAB identity to which that RB corresponds, the RABs and the RBs being identified by RAB and RB identifiers respectively.

The mapping information contained in the RRC Initialisation Information container may comprise NAS binding information.

According to a second aspect of the present invention there is provided UMTS telecommunications system comprising at least one core network and a UTRAN, the UTRAN comprising a plurality of RNCs, pairs of which are arranged to communicate with each other, via said core network, in the event of SRNS Relocation, each RNC being arranged to generate and send a Relocation Required message to the core network in the event that the RNC is the pre-existing SRNS for a UE, the Relocation Required message containing a RRC Initialisation Information container which in turn contains a mapping information enabling a mapping to be made between RABs and RBs for the UE, and each RNC being arranged to receive a Relocation Request message from the core network in the event that the RNC is the Target RNC, the Relocation Request message containing said RRC Initialisation Information container.

It will be appreciated that the core network is arranged to translate a received Relocation Required message into a Relocation Request message for transmission to the Target RNC. The RRC Initialisation Information container is copied transparently in this process.

DETAILED DESCRIPTION

Figure 1:
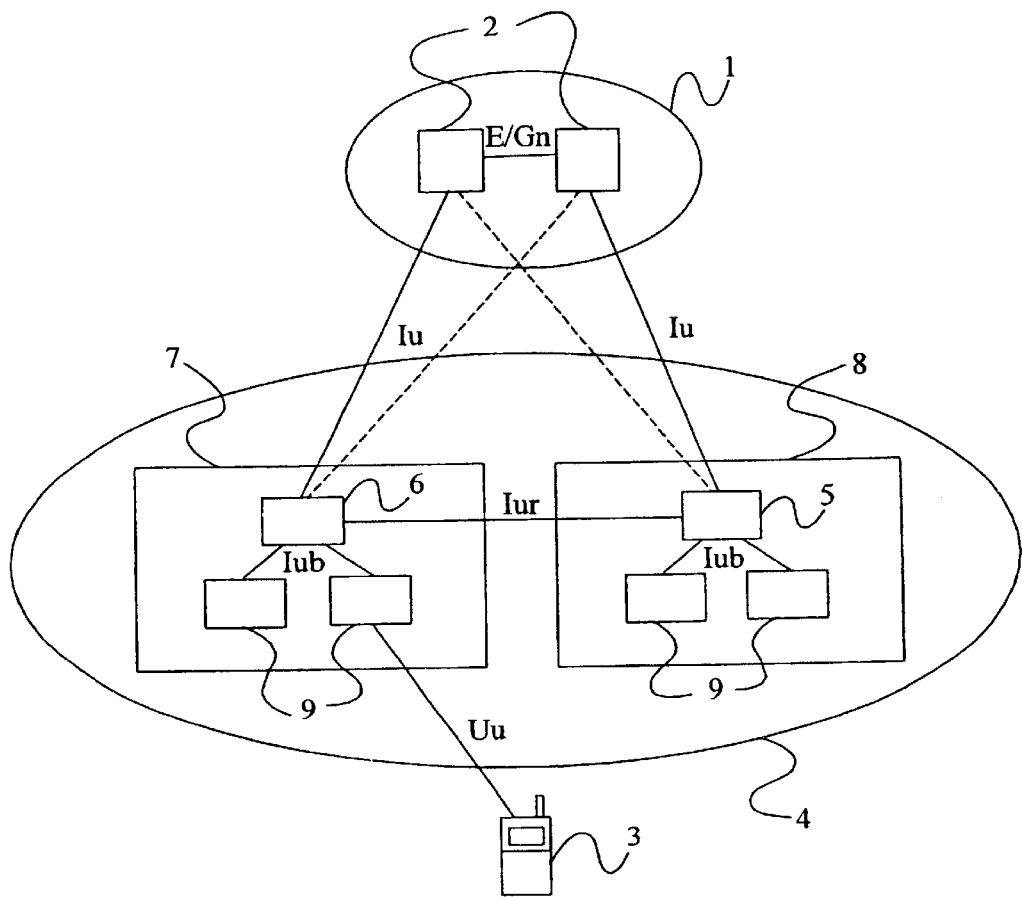
FIG. 1 illustrates schematically a UMTS network.
Figure 2:
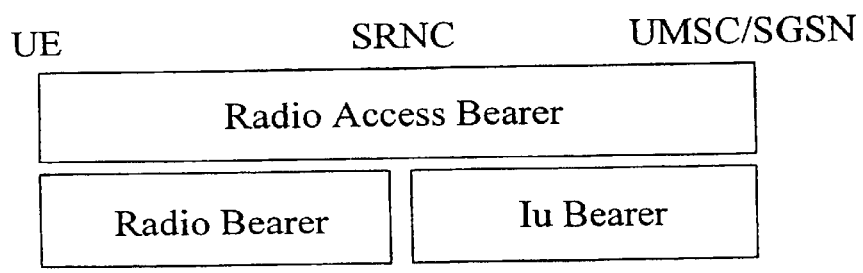
FIG. 2 illustrates schematically the bearer structure used in the UTRAN part of the UMTS network of FIG. 1.

A typical UMTS network has been described above with reference to FIG. 1, whilst the UTRAN bearer structure employed in such a network has been described with reference to FIG. 2.

Figure 3:
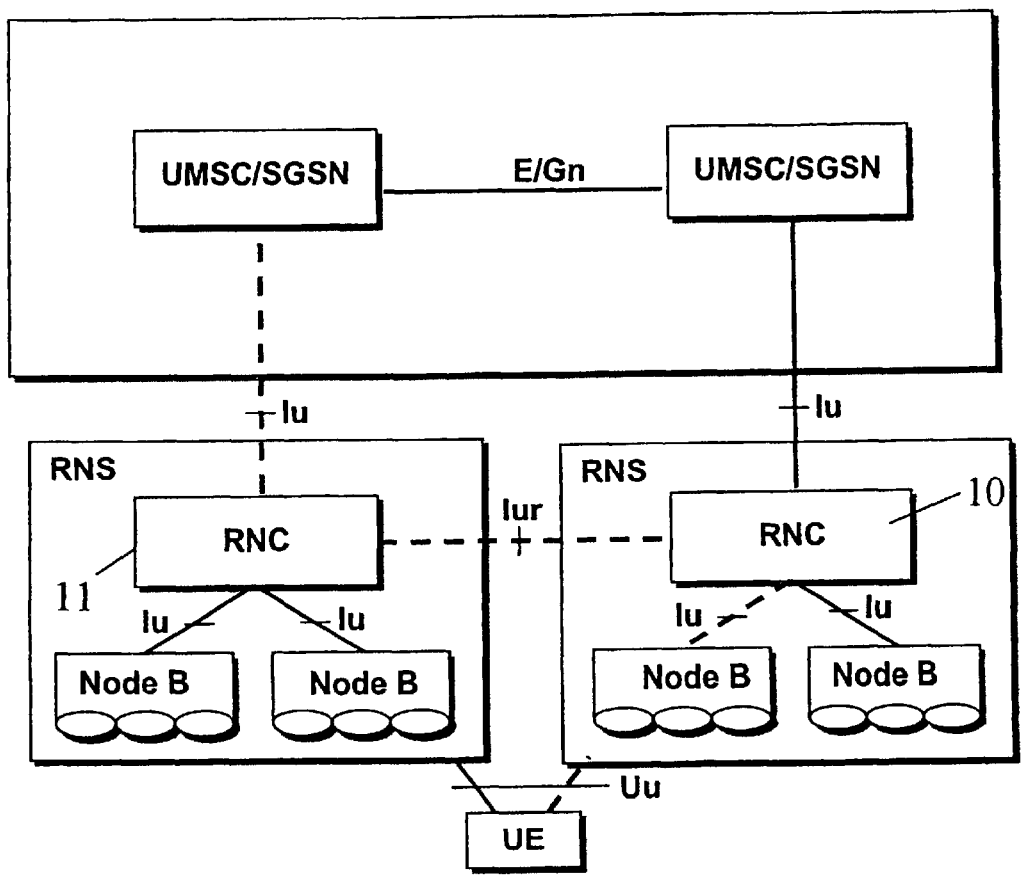
FIG. 3 illustrates a precondition for SRNS relocation in the UMTS network of FIG. 1.
Figure 4:
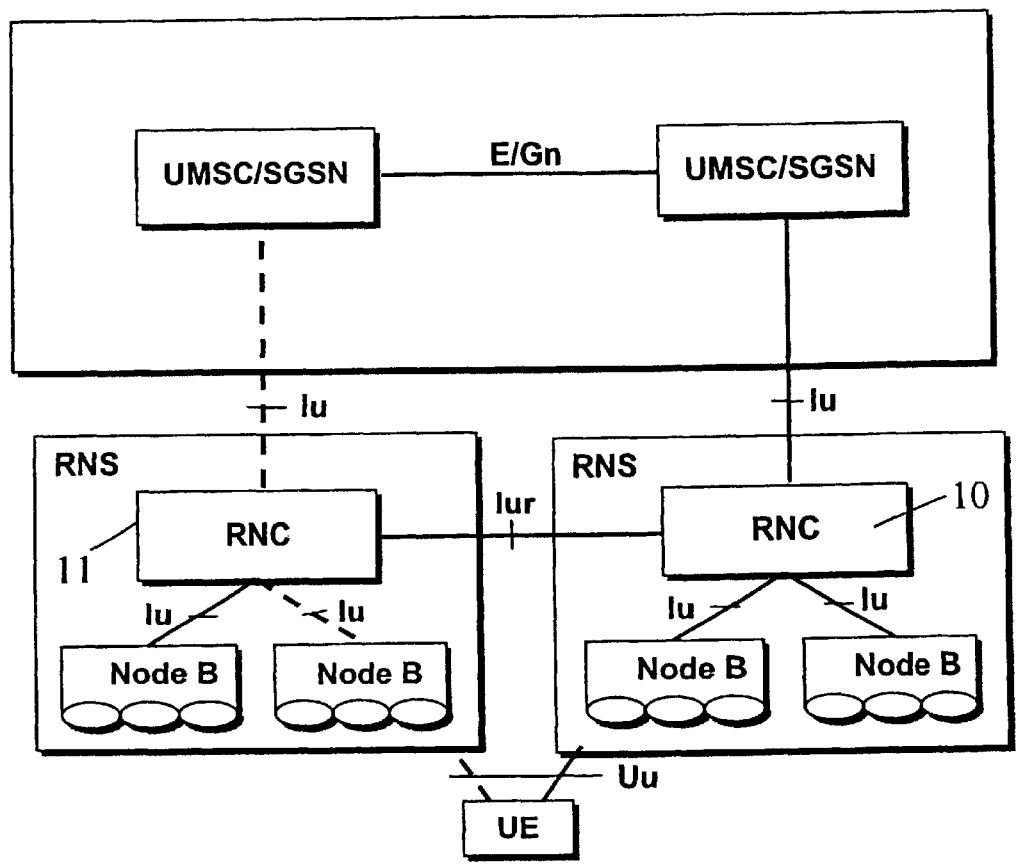
FIG. 4 illustrates a precondition for a SRNS Hard Handover in the UMTS network of FIG. 1.

FIG. 3 illustrates a situation in which User Equipment (UE) is connected to a UMSC/SGSN of a core network of a UMTS network, via a drift RNC 10 and a Serving RNC 11. The "active" connection is illustrated by the broken lines in FIG. 3. Such a situation may arise after the UE has initiated a connection via the Serving RNC 11 and has subsequently moved into the coverage area of the drift RNC 10. FIG. 4 illustrates a situation in which a UE is coupled to a UMSC/SGSN of a core network via only a Serving RNC 11, with the broken lines again illustrating the active connection.

Figure 5:
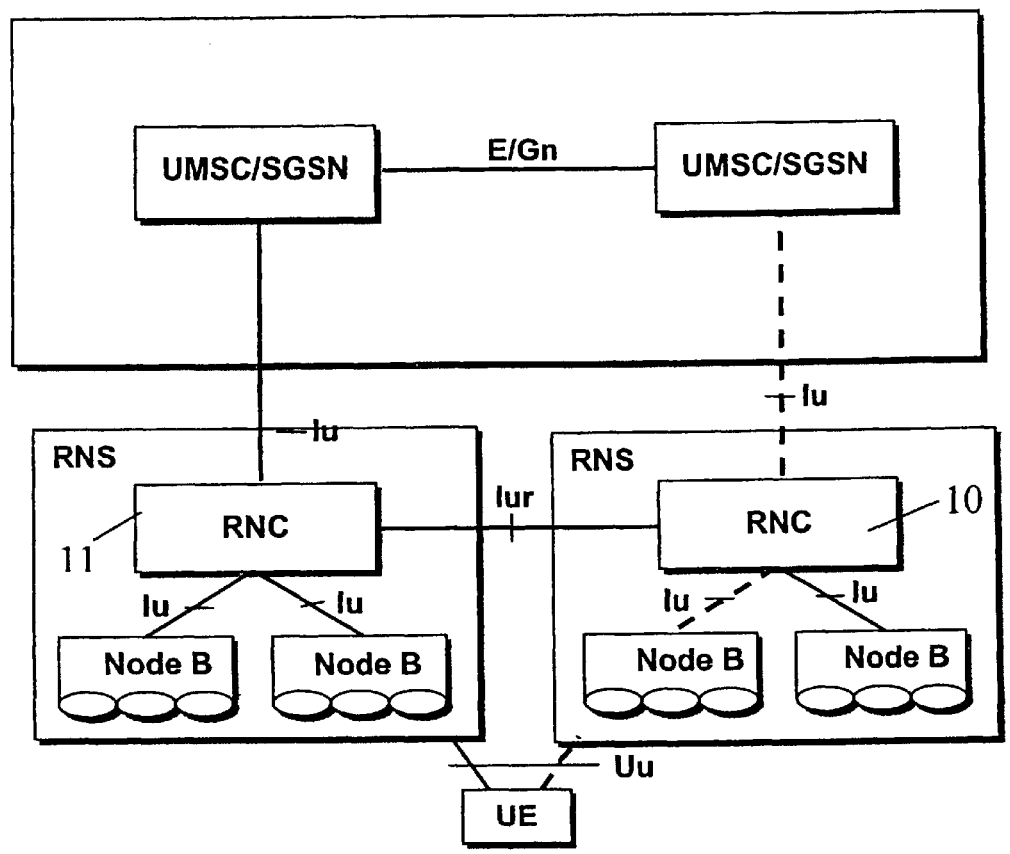
FIG. 5 illustrates the condition after SRNS Relocation/Hard Handover in the UMTS network of FIG. 1, following the preconditions of either FIG. 3 or FIG. 4.

As described above, under certain circumstances the situation illustrated in FIG. 3 may be a precondition for a SRNS Relocation, where the network decides to transfer the user plane connection between the core network and the UTRAN, from the SRNS to the RNS which contains the drift RNC 10. The situation which exists following such a relocation is illustrated in FIG. 5, where the broken lines illustrate the new active connection. FIG. 5 also corresponds to the situation which exists following a Hard Handover and associated Relocation from the precondition illustrated in FIG. 4, or following a Hard Handover in which the "structure" of FIG. 4 is transformed to that of FIG. 3 and a SRNS relocation subsequently occurs resulting in the structure of FIG. 5.

Figure 6:
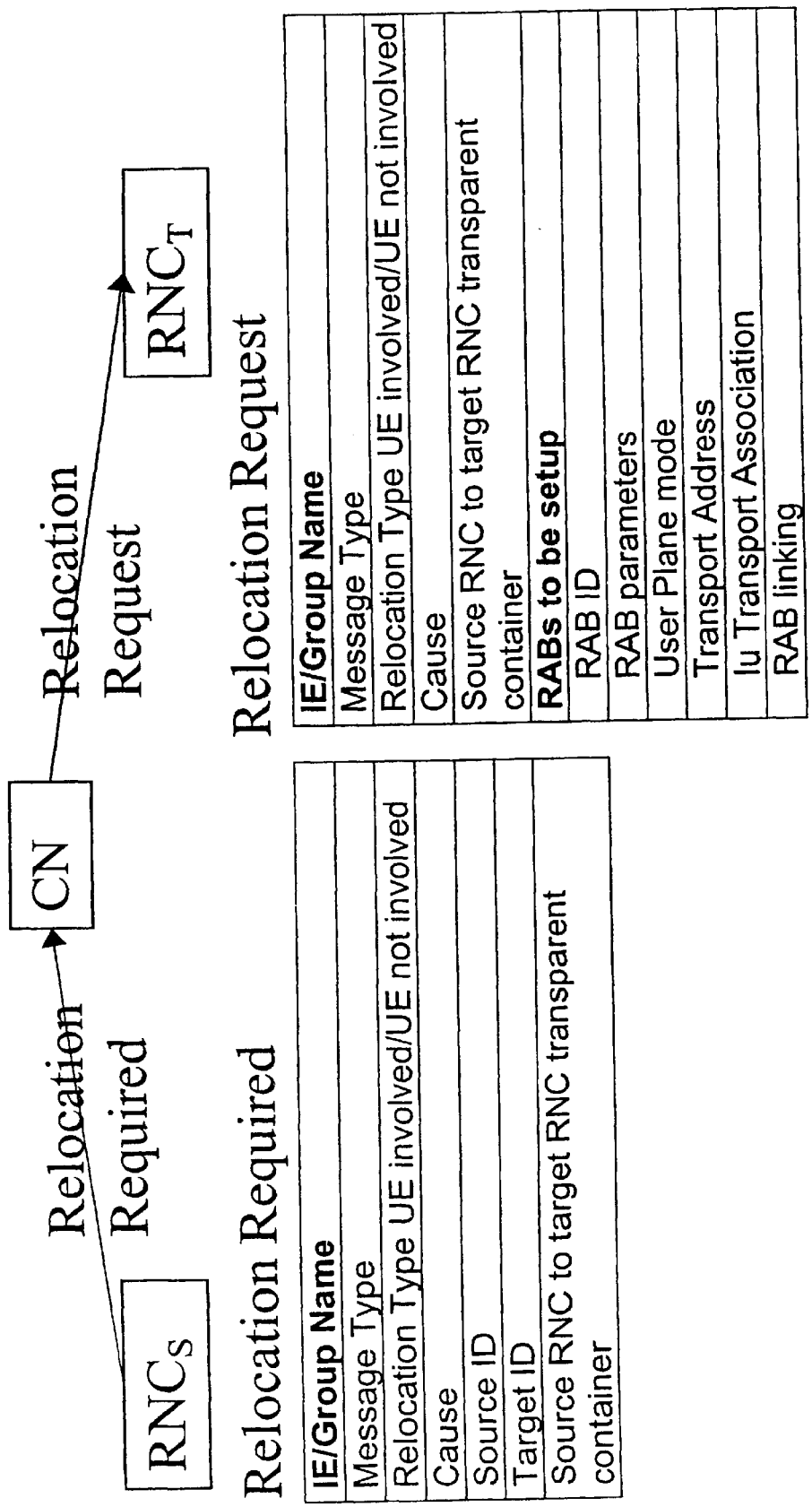
FIG. 6 illustrates signalling at a general level at SRNS Relocation/Hard Handover in the network of FIG. 1, as well as the structure of Relocation messages.

The Relocation process is initiated by the sending of a Relocation Required message from the RNC of the SRNS ($RNC_S$) to the core network over the Iu interface using the RANAP protocol. This is illustrated in FIG. 6, as is the general structure of the Relocation Required message (defined in the RRC specification). As well as including an identification of the Serving RNC and the target RNC, the message contains a Source RNC to target RNC transparent container. The container includes a set of Radio Bearer Information Elements, one for each Radio Bearer (RB) to be transferred. Each element contains an RB identity, RLC identity, and RB mapping information. Notably, the RB mapping information includes the identity of the RAB which is associated with the RB in question.

The UMSC or the SGSN which receives the Relocation Required message reacts to the message as defined in the RANAP protocol. In particular it produces a Relocation Request message which is forwarded to the target RNC via theUMSC/SGSN to which the target RNC is connected (in some cases both the Serving and the target RNCs may be connected to the same UMSC/SGSN). This is again illustrated in FIG. 6, together with the structure of the Relocation Request message. As well as the RAS Ids to be transferred (i.e. setup be the target RNC), the message includes the Source RNC to target RNC transparent (i.e., RRC Initialization Information) container (which is passed transparently by the care network.

Upon receipt of the Relocation Request message, the target RNC must establish an appropriate bearer structure (FIG. 2) between the UE and the core network. Based upon the information contained in the Relocation Request message, the required RABs are setup and the Iu bearers established. The target RNC then examines the contents of the Radio Bearer Information Elements of the transparent container. This information tells the target RNC which RBs are related to which RABs (nb. whilst there may be a one to one mapping between RBs and RABs, this need not be the case and a single RAB may be mapped to two or more RBs).

Figure 7:
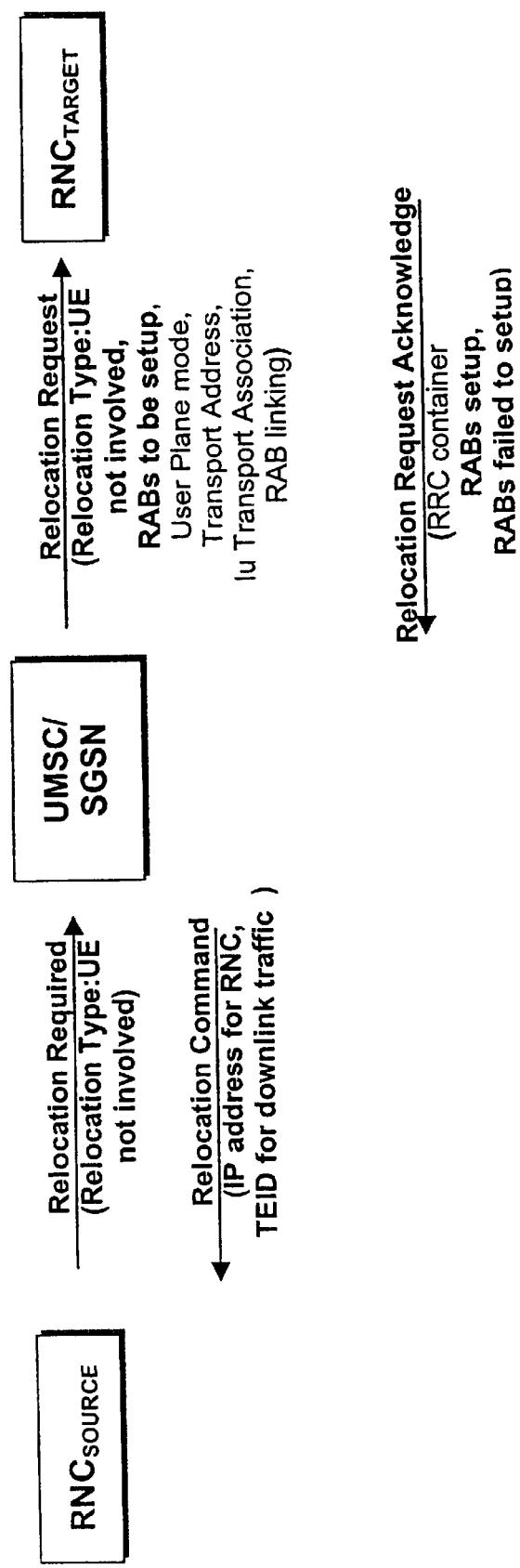
FIG. 7 illustrates on a more detailed level the signalling of FIG. 6.

FIG. 7 illustrates in more detail the signalling involved in a SRNS Relocation. In addition to the Relocation Request and Relocation Request messages, a Relocation Command message is returned from the core network to the $RNC_S$, whilst a Relocation Request Acknowledgement message is returned from the $RNC_T$ to the core network.

It will be appreciated by the person of skill in the art that various modifications may be made to the above described embodiments without departing from the scope of the present invention. For example, under current proposals, NAS binding information is used at RAB assignment request to associate a call in the control plane (e.g. SETUP) and in the user plane. The NAS binding information may be required to make a control plane/user plane association possible in the case of a Hard Handover, in which case the Source RNC to target RNC transparent container could contain NAS binding information. The NAS binding information would then allow the Target RNC to map RBs to RABs.

What is claimed is:

1. A method of performing a Serving Radio Network Subsystem ("SRNS") Relocation for a given User Equipment ("UE") in a Universal Mobile Telecommunications System ("UMTS") network between a UMTS radio network and a UMTS core network, in which the UMTS radio network and the UMTS core network are logically separated, the method comprising the steps of:

sending a Relocation Required message from the serving Radio Network Controller ("RNC") to the core network; and sending a Relocation Request message from the core network to the Target RNC;

wherein the Relocation Required message contains a Radio Resource Control ("RRC") Initialization Information container which is incorporated transparently by the core network into the Relocation Request message and the RRC Initialization Information container in turn contains information enabling a mapping to be made between Radio Access Bearers ("RABs") and Radio Bearers ("RBs") for the UE wherein the RRC Initialization Information container contains a Radio Bearer Information element, the mapping comprises a RAB identity corresponding to each RB, the RABs and the RBs being identified by RAB and RB identifiers, respectively.

2. A method of performing a Serving Radio Network Subsystem ("SRNS") Relocation for a given User Equipment ("UE") in a Universal Mobile Telecommunications System ("UMTS") network between a UMTS radio network and a UMTS core network, in which the UMTS radio network and the UMTS core network are logically separated, the method comprising the steps of:

sending a Relocation Required message from the serving Radio Network Controller ("RNC") to the core network; and sending a Relocation Request message from the core network to the Target RNC;

wherein the Relocation Required message contains a Radio Resource Control ("RRC") Initialization Information container which is incorpoated transparently by the core network into the Relocation Request message and the RRC Initialization Information container in turn contains information enabling a mapping to be made between Radio Access Bearers ("RABs") and Radio Bearers ("RBs") for the UE wherein the mapping information contained in the RRC Initialization Information container comprises NAS binding information.

* * * * *